(12) United States Patent
Argoitia et al.

(10) Patent No.: US 6,815,065 B2
(45) Date of Patent: Nov. 9, 2004

(54) ALL-DIELECTRIC OPTICAL DIFFRACTIVE PIGMENTS

(75) Inventors: Alberto Argoitia, Santa Rosa, CA (US); Vladimir P. Raksha, Santa Rosa, CA (US); Paul T. Kohlmann, Windsor, CA (US)

(73) Assignee: Flex Products, Inc., Santa Rosa, CA (US)

( * ) Notice: Subject to any disclaimer, the term of this patent is extended or adjusted under 35 U.S.C. 154(b) by 0 days.

(21) Appl. No.: 10/365,090

(22) Filed: Feb. 11, 2003

(65) Prior Publication Data

US 2003/0224164 A1 Dec. 4, 2003

Related U.S. Application Data
(60) Provisional application No. 60/384,629, filed on May 31, 2002.

(51) Int. Cl.[7] ............................... B32B 5/16; G02B 5/18
(52) U.S. Cl. ....................... 428/403; 359/566; 359/568; 359/576; 428/543; 428/688
(58) Field of Search ................................. 428/403, 543, 428/688, 402; 359/566, 568, 576

(56) References Cited

U.S. PATENT DOCUMENTS

| | | | |
|---|---|---|---|
| 3,123,490 A | | 3/1964 | Bolomey et al. |
| 3,981,568 A | * | 9/1976 | Bartolomei .................. 359/587 |
| 5,624,076 A | * | 4/1997 | Miekka et al. .................. 241/3 |
| 5,744,223 A | | 4/1998 | Abersfelder et al. ......... 428/206 |
| 5,907,436 A | * | 5/1999 | Perry et al. .................. 359/576 |
| 6,068,691 A | | 5/2000 | Miekka et al. ............... 106/403 |
| 6,112,388 A | * | 9/2000 | Kimoto et al. ................ 29/17.3 |
| 6,168,100 B1 | * | 1/2001 | Kato et al. ...................... 241/1 |
| 6,344,367 B1 | * | 2/2002 | Naya et al. ..................... 438/32 |
| 6,383,638 B1 | | 5/2002 | Coulter et al. ............... 428/403 |
| 6,692,830 B2 | * | 2/2004 | Argoitia et al. ............. 428/403 |

FOREIGN PATENT DOCUMENTS

| | | | |
|---|---|---|---|
| EP | 0 753 545 A2 | 1/1997 | ............. C09C/1/00 |
| WO | WO 93/23481 | 11/1993 | ............. C09C/1/62 |
| WO | WO 95/13569 | 5/1995 | |
| WO | WO 98/53011 | 11/1998 | ............. C09C/1/00 |
| WO | WO 03/011980 A1 | 2/2002 | ............. C09C/1/00 |

OTHER PUBLICATIONS

U.S. patent application Ser. No. 10/117,307, Agroitia et al., filed Apr. 5, 2002.
U.S. patent application Ser. No. 10/029,405, Argoitia et al., filed Dec. 20, 2001.
U.S. patent application Ser. No. 09/919,346, Argoitia et al., filed Jul. 31, 2001.
Argoitia, Alberto, *Pigments Exhibiting a Combination of Thin Film and Diffracive Light Interference*, AIMCAL 2002 Fall Technical Conference Meeting (Oct. 20, 2002).
Argoitia and Witzman, *Pigments Exhibiting Diffractive Effects*, Soc. of Vac. Coaters, 45th Annual Tech. Conf. Proceed. (2002).
Van Renesse (Ed.), *Optical Document Security*, 2nd Ed., Artech House, 254, 349–69 (1997).

* cited by examiner

*Primary Examiner*—H. Thi Le
(74) *Attorney, Agent, or Firm*—Allen, Dyer, Doppelt, Milbrath & Gilchrist, P.A.

(57) ABSTRACT

All-dielectric diffractive pigment flakes can be applied to an object to impart a diffractive effect to the object without substantially changing the background color of the object. In one case, such diffractive pigment flakes can be applied to a white object to impart a white diffractive effect. The thickness of the dielectric layers in the diffractive pigment flakes can be chosen to provide thin-film interference, as well as diffraction from the interfaces between layers patterned with a diffraction grating. In some cases, the thin-film interference can provide color shifting in addition to the diffractive effect.

25 Claims, 8 Drawing Sheets

ALL-DIELECTRIC OPTICAL DIFFRACTIVE PIGMENTS

CROSS-REFERENCE TO RELATED APPLICATIONS

This patent application claims priority from commonly owned Provisional U.S. Patent Application No. 60/384,629 entitled ALL-DIELECTRIC OPTICAL DIFFRACTIVE PIGMENTS, filed May 31, 2002 by Alberto Argoitia, Vladimir Raksha, and Paul Kohlmann; and from commonly owned U.S. patent application Ser. No. 10/029,405 entitled ACHROMATIC MULTILAYER DIFFRACTIVE PIGMENTS AND FOILS, filed Dec. 20, 2001 by Alberto Argoitia, Paul G. Coombs, Charles T. Markantes, and Richard A. Bradley, Jr.; from commonly owned U.S. patent application Ser. No. 09/919,346, entitled DIFFRACTIVE PIGMENT FLAKES AND COMPOSITIONS, filed Jul. 31, 2001 by Albert Argoitia and Richard A. Bradley, Jr.; and from commonly owned U.S. patent application Ser. No. 10/117,307 entitled CHROMATIC DIFFRACTIVE PIGMENTS AND FOILS, filed Apr. 5, 2002 by Alberto Argoitia, Roger Phillips, Michael Nofi, Paul G. Coombs, Charles T. Markantes, and Richard A. Bradley, Jr., the disclosures of which are hereby incorporated in their entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to optically variable pigments and more particularly to all-dielectric diffractive pigments, including all-dielectric diffractive pigments with thin-film interference structures.

BACKGROUND OF THE INVENTION

Optically variable pigments ("OVPs"™) are used in a wide variety of applications. They can be used in paint or ink, or mixed with plastic. Such paint or ink is used for decorative purposes or as an anti-counterfeiting measure on currency. Although the pigment flakes might be very small, optical effects arise from the aggregate effects of the flakes, which are often generally aligned with the plane of the substrate. One type of OVP uses thin-film layers on a substrate to form a Fabry-Perot type optical structure. Generally, a layer of optically absorbing material is separated from a reflective layer by a dielectric (spacer) layer. Additional layers may be added for additional effects, such as adding additional spacer-absorber layer pairs. The reflective layer is often a layer of metal, making the pigment flake opaque. Images printed or painted with the opaque pigment flakes are also opaque, or the pigment flakes dull or change the underlying color.

Transparent pigment flakes can be made using alternating layers of dielectric materials in a (high-low-high)$^n$ or (low-high-low)$^n$ fashion to form an optical interference stack, which is often referred to as a dichroic stack. Dichroic pigment flakes can be essentially transparent, reflecting one color and transmitting another color. The color of an image printed with some dichroic pigment flakes changes with viewing angle, and such pigments allow overprinting, so that the viewer can see the underlying image through the dichroic pigment flakes.

Another type of pigment uses a diffraction pattern (grating), such as a series of grooves, to create a diffractive interference structure. The diffraction grating is formed in a reflective layer in the flake, similar to the patterns formed in diffractive foils. Diffractive pigments have been used to create an iridescent effect, both on printed media and in paints, such as automotive paint. Unfortunately, the reflective layers are usually opaque, thus the diffractive pigment flakes dulls or changes the underlying color, as with the Fabry-Perot-type opaque pigment flakes.

Pearlescent paints and pearlescent additives have been popular for some time for painting cars, motorcycles, boats, helmets, and other objects. Many such pigments are made using processed mica flake that is coated with a high-index material, such as iron oxide or titania. The thickness of the mica and/or coating can be varied to obtain different pearlescent colors; however, paints made with such pigments do not show a diffractive effect.

SUMMARY OF THE INVENTION

A pigment flake produced according to embodiments of the present invention provide diffractive effects without a metal reflective layer. In a particular embodiment, a diffractive pigment flake has a diffraction grating formed on the surface of an inorganic dielectric thin film layer. The surface provides a diffractive interface when the pigment flake is dispersed in a carrier, such as an ink vehicle or a paint vehicle, or when a second thin film layer is formed over the diffraction grating pattern. In some embodiments, the diffraction grating pattern is replicated through the second, and perhaps subsequent, thin film layer(s), and additional diffractive interfaces are formed. Strong diffractive effects are enabled when the pigment flakes with five or less dielectric layers are dispersed in a carrier.

Unlike diffractive flakes having opaque metal reflectors, some embodiments of all-dielectric diffractive pigment flakes according to the present invention are semi-transparent, and can have reflecting and/or transmitting colors to be matched to the object that they are applied on. In other embodiments, all-dielectric diffractive pigment flakes having a high-low-high-low-high optical design centered at 550 nm provides a white diffractive effect when applied over a white object. Such embodiments are alternatively applied over colored surfaces to impart a diffractive effect without substantially changing the background color of the surface. In some embodiments of all-dielectric diffractive pigment flakes made according to embodiments of the present invention, the thickness of the dielectric layers is chosen to create thin-film interference, and impart a color-shifting or pearlescent effect, as well as a diffractive effect.

WRITTEN DESCRIPTION

I. Introduction

Figure 1A:
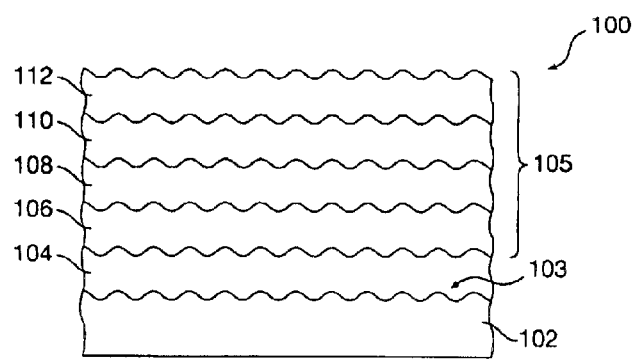
FIG. 1A is a simplified cross section of a general multi-layer dielectric stack formed on a patterned substrate according to an embodiment of the present invention.

Diffractive effects are obtained using pigment flakes having dielectric layers, without a metallic reflector. The diffractive effects can be in combination with thin film interference effects technology using all-dielectric multi-layer optical stacks. This combination creates new color effects not seen before. The dielectric coatings are substantially non-absorbing materials, resulting in multi-layer stacks with high transmittances or high reflectances, unlike diffractive structures using metallic reflective layers, which are essentially opaque. The color transmitted or reflected depends on the optical design and are complementary for this all-dielectric systems.

For some designs, the color reflected or/and transmitted will shift strongly with the angle of the incident light. In the case of color shifting designs, the color effects are unique because in diffuse light conditions the color travels from high to low wavelengths as the viewing angle increases. However, in highly directional illumination conditions (e.g. sunlight) the color moves in the opposite direction from low to high wavelengths with angle. In diffuse light, the color observed is dominated by the color from optically variable effects from optical thin film interference, while in highly directional light the optically variable effects arise from diffraction.

In some situations with combined lighting conditions, the color travels in unusual ways because both physical color-shifting phenomena (diffraction and thin film interference) can be seen simultaneously. In addition, the all-dielectric pigments can be partially transparent, so that the inherent color of the coated object will also influence the final visual appearance of the object, or images beneath the all-dielectric pigment can be observed.

For some other optical designs the "background color" of the pigment will not shift dramatically with the angle of the incident light. Considering that the all-dielectric optical stack that creates the pigment can be semi-transparent, the background color observed on an object can be strongly dependent on the inherent (base) color of the object before the paint is applied. In particular, all-dielectric diffractive pigments can be made that impart little, and in some cases essentially no, change in background color. Such pigments can be used to obtain a white diffractive effect, in other words, an object that appears essentially white or pearlescent, but that exhibits variable perceived color, lightness, hue, and/or chroma, depending on the angle of view.

For example, an optical design of the type HLHLH made of thin film layers having quarter wave optical thicknesses ("QWOT") of 530 nm with ZnS as the high refractive index (H) and $MgF_2$ as the low refractive index (L) material will not present a characteristic color tint. These materials are merely exemplary, and other dielectric materials, such as $TiO_2$ for the high-index material and $SiO_2$ for the low-index material, may be used. Many other suitable materials are well-known and may be used in various combinations. As used herein, a high-index material has an index of refraction greater than about 1.65, and preferably greater than about 2, and a low-index material has an index of refraction less than about 1.65. It is not necessary that each high-index layer be made of the same high-index material, or that each low-index layer be made of the same low-index material, and materials may be graded or mixed within a layer.

This 5-layer optical design shows strong diffracting color effects when deposited on a linear grated foil with groove frequencies between 1300 and 3000 lines per mm. The optical thin film layers are removed from the patterned foil and processed into pigment flakes. When this particular pigment is applied on a white painted object, the color observed in diffuse light (e.g. cloudy day) is dominated by the white color of the object, but in highly directional illumination conditions (e.g. sunlight) the object will present a diffractive rainbow effect. When the same optical design is shifted from 530 nm to lower or higher wavelengths, the pigment will present a bluish or reddish tint on reflection and yellowish or greenish tint on transmission, respectively.

Diffractive pigments with opaque metallic reflectors impart a color when applied to a white background. Thus, such pigments do not provide a white diffractive effect, but often a silverish or grayish diffractive effect in the case of an aluminum reflector, a yellowish effect in the case of a nickel reflector, and a reddish effect in the case of a copper reflector. Similarly, when diffractive pigments with metallic reflectors are applied over colored backgrounds, the diffractive pigment dilutes the background color, even if the metal reflective layers are semi-opaque. For example, applying metallic diffractive pigments over a red background creates a pinkish diffractive effective, rather than a red diffractive effect. Thus, all-dielectric diffractive pigments according to embodiments of the present invention can be applied to a previously painted or otherwise colored object to provide a diffractive effect that essentially preserves the color of the object while imparting a diffractive effect. The diffractive effect can be chosen (designed) to operate in conjunction with a particular background color to achieve a specific effect.

Thin-film interference structures can be combined with an all-dielectric diffractive structure to provide transparent (clear or tinted) color-shifting diffractive pigments. The thin-film interference structures are essentially dielectric thin-film stacks, which do not have the type of metallic reflector layer commonly used in Fabry-Perot type interference structures. Hence, the dielectric thin-film stacks can be transparent, typically with a characteristic color shift, which operates in conjunction with the diffractive effects of the pigment flake or foil to provide unique optical effects.

II. Exemplary Flakes

FIG. 1A is a simplified cross section of a general multi-layer diffractive foil 100 according to an embodiment of the invention. The diffractive foil 100 is formed on a substrate

102. The substrate has been patterned with a diffractive structure 103 (diffraction grating pattern), and layers of dielectric material are deposited over the patterned substrate. The pattern may be a simple diffraction pattern, or a holographic image pattern, for example. The substrate could be an embossed plastic sheet, such as a roll of polyethylene terephthalate ("PET"), and the thin film layers could be deposited in a roll-coating system, for example. The substrate might also be a sheet of embossed metal foil or laminate, or an embossed wafer, slide, or blank.

One technique suitable for producing pigment flakes according to embodiments of the present invention involves depositing successive thin film layers on a patterned roll of PET to form a diffractive dielectric stack. The dielectric stack is separated from the PET substrate or "web", and processed, such as by grinding and sorting, into pigment flakes. Suitable pigment flakes are typically in the range of about 10–1,000 microns across and about 1–2 microns thick, although these dimensions are merely exemplary and in some embodiments pigments are generally less than 100 microns across.

An optional release layer 104 can be formed over the substrate 102 to facilitate removal of the deposited layers from the substrate. The release layer could be soluble in water, such as CaO, $CaF_2$, $Na_3AlF_6$ (cryolite), $NaNO_3$, and NaCl. Other materials, including organic materials, metals, and semiconductors might be used for the release layer. While using NaCl ("salt") allows the release layer to be activated by water, other materials might be released using an acid solution, a basic solution, or other solvent, including organic solvents.

A dielectric thin-film optical stack 105 is formed over the substrate 102 and optional release layer 104, with the dielectric optical stack having a plurality of alternating dielectric layers of a higher refractive index (H) material 106, 110 and a lower refractive index (L) material 108, 112. The alternating higher and lower index layers of the dielectric optical stack can be formed in various configurations on the substrate 102, such as $(HL)^n$, $(LH)^n$, $(LHL)^n$, and $(HLH)^n$, and combinations of them, wherein n is an integer between 1 and 100, typically 2–4, and the L and H layers are each a QWOT at a selected design wavelength. Other suitable optical designs can also be obtained by the combination of H and L coatings with different optical thickness, and in some designs, some layers might not have a QWOT of the same wavelength. Similarly, some optical designs might be symmetrical, such as $H(LH)^n$.

The diffractive substrate foil can be produced with grooves with a linear, cross or other configurations. The shape of the grooves can be triangular, sinusoidal, square-wave, etc. In these kinds of pigments, the optical appearance of a coated object will strongly depend on the diffractive efficiencies of the zero and higher orders. The efficiency of the different orders is accomplished by the selection of the groove depth, shape and frequencies of the foil substrate grating.

The thin-film layers can be removed from the substrate and applied as a film or processed into pigment flakes for use in paints, inks, powder coatings, cosmetics, and plastic extrusions and castings, for example. The thin-film layers can be bonded to a transfer substrate or backing before being released from the substrate.

Figure 1B:
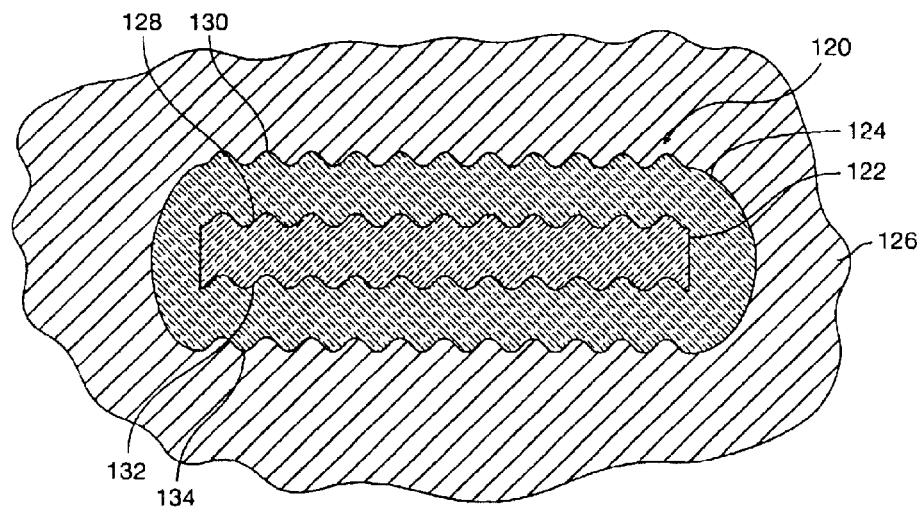
FIG. 1B is a simplified cross section of an all-dielectric diffractive pigment flake according to an embodiment of the present invention.

FIG. 1B is a simplified cross section of an all-dielectric diffractive pigment flake 120 according to an embodiment of the present invention. A patterned dielectric flake substrate 122 has been encapsulated with an outer dielectric layer 124 and is dispersed in a carrier 126, such as a paint vehicle or ink vehicle. Alternatively, the outer dielectric layers do not have to encapsulate the flake substrate.

The patterned dielectric flake substrate has a sufficiently different refractive index from the outer dielectric layer to establish a diffractive interface 128. Although the dielectric pigment flake only has three layers, four diffractive interfaces 128, 130, 132, 134 are created. A first diffractive interface 130 between the carrier 126 and the outer dielectric layer 124 a second diffractive interface 128 between the outer layer and the flake substrate 122, a third diffractive interface 132 between the flake substrate and the other side of the outer dielectric layer, and a fourth diffractive interface 134 between the other side of the outer dielectric layer and the carrier. Each of the diffractive interfaces can contribute to the diffractive effect of the pigment because the flake is all-dielectric, allowing light that is not diffracted by an upper interface to be diffracted by a lower interface. In conventional diffractive flake with metal reflector layers the diffractive effects from the overlying dielectric layers do not significantly contribute to diffraction from the flake because the difference in refractive indices between the dielectric layers and surrounding carrier is not great enough and the layers are typically not of a thickness to contribute to the diffractive effect.

A three-layer dielectric stack dispersed in an appropriate carrier can typically achieve a reflectivity in the range of 20–40%. Such low-reflectivity diffractive pigments may be desirable when used in applications where a high degree of transmission through the pigment is desired, such as when overprinting an image, for example. When using all-dielectric pigment flakes with relatively low reflectivity, overlap of the pigment flakes should be avoided because the light transmitted through an upper flake can diffract off a lower flake, and the light diffracted off the two flakes might interfere, degrading the diffractive "rainbow" effect. Such low-reflectivity flakes might be used in relatively low concentrations or applied to avoid overlapping dielectric diffractive pigment flakes.

The outer dielectric layer might be applied using a sol-gel process or a vacuum deposition process, including various plasma-assisted vacuum deposition processes, or other process. In a particular embodiment the carrier has a low index of refraction and the outer dielectric layer has a high index of refraction. In other embodiments, the outer dielectric layer may have a smooth outer surface that does not contribute to diffraction. In that case, it may be desirable to avoid forming a reflective interface with the carrier, e.g. by using a low-index outer layer in a low-index carrier. In some instances, a single-layer dielectric flake patterned with a diffraction grating dispersed in a carrier creates a diffractive effect, such as a high-index patterned flake in a low index carrier, or vice versa.

Figure 1C:
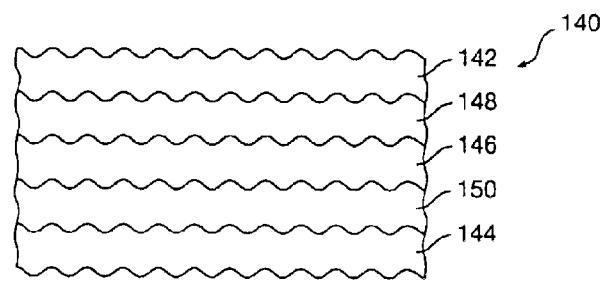
FIG. 1C is a simplified cross section of an all-dielectric diffractive pigment flake according to another embodiment of the present invention.

FIG. 1C is a simplified cross section of an all-dielectric diffractive pigment flake 140 according to another embodiment of the present invention. The outer layers 142, 144 are high-index material, as is the center layer 146, and the intermediate layers 148, 150 are low-index layers, providing an optical design commonly known as HLHLH. That is, the high-index layers are made of a material(s) having a high index of refraction, and the low-index layers are made of a material(s) having a low index of refraction. Similar pigment flakes according to other embodiments of the present invention may have more layers, or fewer layers. This design, and other designs having an odd number of layers, provides outer layers 142, 144 that are both high-index layers. This type of configuration is desirable for flakes that will be dispersed in a low-index carrier because both outer layers will provide a diffractive interface in the carrier if the outer surface of the outer layers is patterned with a diffraction grating. A low-index outer layer would tend to "disappear" in a low-index carrier, even though it produces a reflective interface in air. Alternatively, a 5-layer flake could have an optical design of LHLHL for use in a high-index carrier, for example.

It is generally desirable to obtain the desired pigment effect in as few layers as possible. The number of layers may be chosen according to the desired reflectivity of the pigment flake. Using conventional materials in high-low dielectric stacks, a 3-layer stack typically can achieve an average reflectance of between about 20–40% in air, a 5-layer stack typically has a reflectance of about 70%, and an 11-layer stack typically has a reflectance of about 90%. In the example of a white diffractive pigment, an average reflectivity in air of about 20% is desirable to provide a suitable diffractive effect, while in some embodiments an average reflectivity in air less than 90% is desirable to provide a strong diffractive effect, yet allow some transmission to and from the underlying substrate. More layers generally produce more reflection until the dielectric stack approaches complete reflection. Thus, pigment flakes having only a few dielectric layers can achieve suitable reflectivity for a desirable diffractive effect. Of course, the reflectivity relates to light having a particular wavelength, and depends on the materials used, among other variables.

The thickness of the layers in a dielectric stack can be chosen to provide a dichroic effect, where light of one color is reflected, and light of the other colors is transmitted through the stack. Such dichroic stacks often exhibit what is commonly known as color travel. Color travel is the change in perceived color as the viewing angle (or angle of illumination) changes. Combining a dichroic effect with a dielectric diffractive structure is particularly desirable to avoid destructive interference from overlapping, dielectric diffractive flakes having low to moderate reflectivity. A dichroic design will in effect act as a filter. Compared to a white diffractive pigment (centered in the visible spectrum), a diffractive pigment with a dichroic effect will show part of the visible spectrum, filtering other portions. Diffractive pigment can be made with thin film stacks exhibiting little color travel by centering the optical design in the middle of the visible spectrum (white), or by using dielectric thin film stacks that do not produce significant thin-film interference, yet provide reflective interfaces to create a diffractive effect.

III. Experimental Results

A number of different types of dielectric diffractive pigment flakes according to embodiments of the present invention were made and tested. The pigment flakes were incorporated into a clear paint binder at a ratio of 0.3:3.9 (pigment:binder) to form paint formulations. The paint formulations were applied to Leneta™ cards (generally, a card having a white field and a black field) using a doctor blade to draw down the pigment. Drawing down ink or paint generally flattens the pigment flakes in the plane of the surface of the card. Paint or ink may be applied using other techniques, such as spraying, painting, silk-screen printing, or Intaglio printing, that substantially align the flakes in the plane of the substrate.

Reflectance measurements were made under diffuse illumination with a DataColor SF600+ spectrophotometer using an integrating sphere. Goniospectrophotometric ("color travel") measurements were made at 45 degrees incidence from −32 to 80 degrees receiving angle on black Leneta™ card fields according to standard CIE™ colormetric conventions.

Several samples were produced that appeared essentially neutral in background color. Such pigments may be used over a white object to obtain a white diffractive effect. Similarly, clear all-dielectric pigments can be used over colored objects to provide a diffractive effect without substantially altering the base color. For example, a clear diffractive pigment flake may be applied over a red object to obtain a diffractive red effect. Diffractive pigments using metal reflectors generally lighten or obscure the color of the underlying object because of the generally opaque metal layer.

Figure 2A:
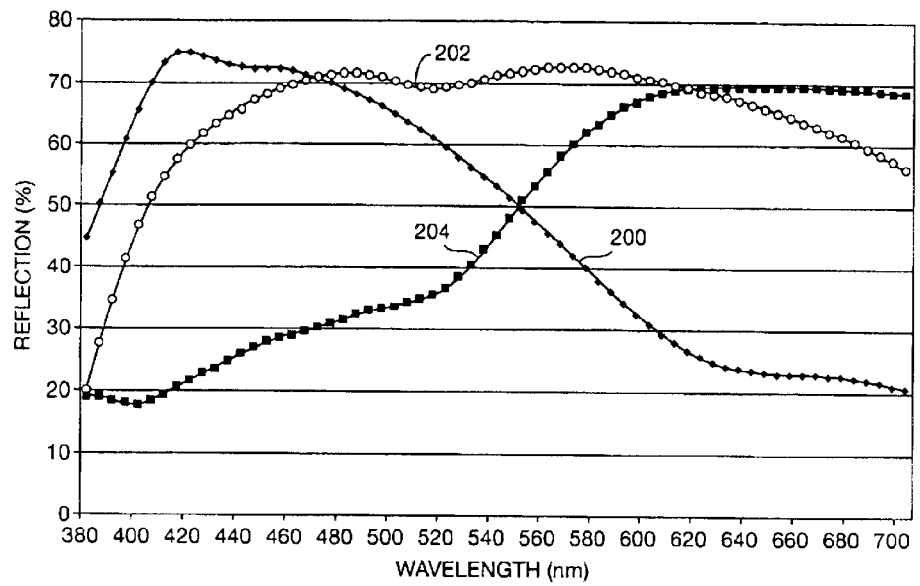
FIG. 2A is a family of simplified plots of reflectance versus wavelength measured for three different optical designs according to embodiments of the present invention.

FIG. 2A is a family of simplified plots of reflectance versus wavelength measured for three different optical designs according to embodiments of the present invention. The first plot 200 is for a five-layer design (HLHLH) at a design wavelength of 450 nm, using ZnS as the high-index material and $MgF_2$ as the low-index material. The diffraction grating was 2,000 lines/mm. This optical design had a bluish tint as a background color when viewed in reflection.

The second plot 202 is for a nine-layer design having a first layer of ZnS 1QWOT at 500 nm, a second layer of $MgF_2$ 2QWOT at 495 nm, a third layer of ZnS 1QWOT at 500 nm, a fourth layer of $MgF_2$ 1QWOT at 495 nm, a fifth layer of ZnS 1QWOT at 400 nm, a sixth layer of $MgF_2$ 2 QWOT at 397 nm, a seventh layer of ZnS 2 QWOT at 400 nm, an eighth layer of $MgF_2$ 2 QWOT at 397 nm and a ninth layer of ZnS 2QWOT at 400 nm. The diffraction grating had a line spacing of 1,400 lines/mm. This optical design was fairly neutral in color.

The third plot 204 is for a seven-layer design having a first layer of ZnS 2 QWOT at 434 nm, a second layer of $MgF_2$ 2 QWOT at 375 nm, a third layer of ZnS 2 QWOT at 391 nm, a fourth layer of $MgF_2$ 2 QWOT at 354 nm, a fifth layer of ZnS 2 QWOT at 391 nm, a sixth layer of $MgF_2$ 2 QWOT at 375 nm, and a seventh layer of ZnS 2 QWOT at 434 nm. The diffraction grating had a line spacing of 1,400 lines/mm. This optical design had a goldish tint as a background color when viewed in reflection.

Figure 2B:
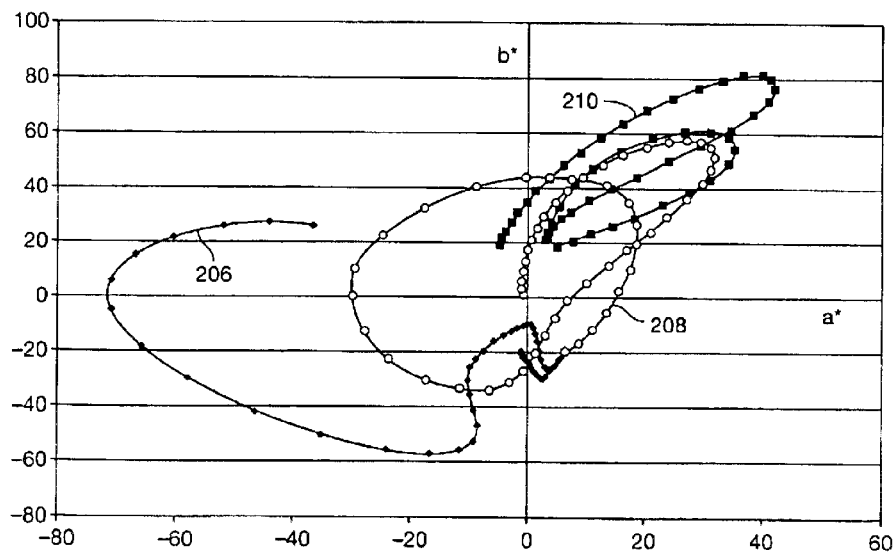
FIG. 2B is a family of simplified goniospectrophotometric plots of the samples discussed in conjunction with FIG. 2A.

FIG. 2B is a family of simplified goniospectrophotometric plots of the samples illustrated in FIG. 2A. The first plot 206 illustrates the color travel of the blueish sample discussed in association with the first plot 200 in FIG. 2A. The second plot 208 illustrates the color travel of the neutral sample discussed in association with the second plot 202 in FIG. 2A. The third plot 210 illustrates the color travel of the goldish sample discussed in association with the third plot 206 in FIG. 2A. Other designs for other background colors can similarly be designed and made.

The reflectivity plots shown in FIG. 2A show a typical characteristic of having higher reflectivity in one portion of the spectrum than another. The average reflectivity of an all-dielectric flake in the visible spectrum is the reflectivity averaged between about 400–700 nm. With all-dielectric diffractive flakes, light that is not reflected is generally transmitted through the flake. Thus, plots of the transmission characteristics would be the inverse of the reflectivity plots. The average reflectivity provides an indication of the balance between the reflectivity and transmission of the flake. In one embodiment of the present invention, the average reflectivity in the visible spectrum of all-dielectric pigment flakes is at least 20% (measured in air) to provide desirable diffractive effects. In another embodiment, the average reflectivity in the visible spectrum of all-dielectric pigment flakes is not more than 90% (measured in air) to allow transmission of light through the diffractive pigment flakes to the underlying substrate, and to allow the color or images printed on the underlying substrate to be observed.

Figure 3A:
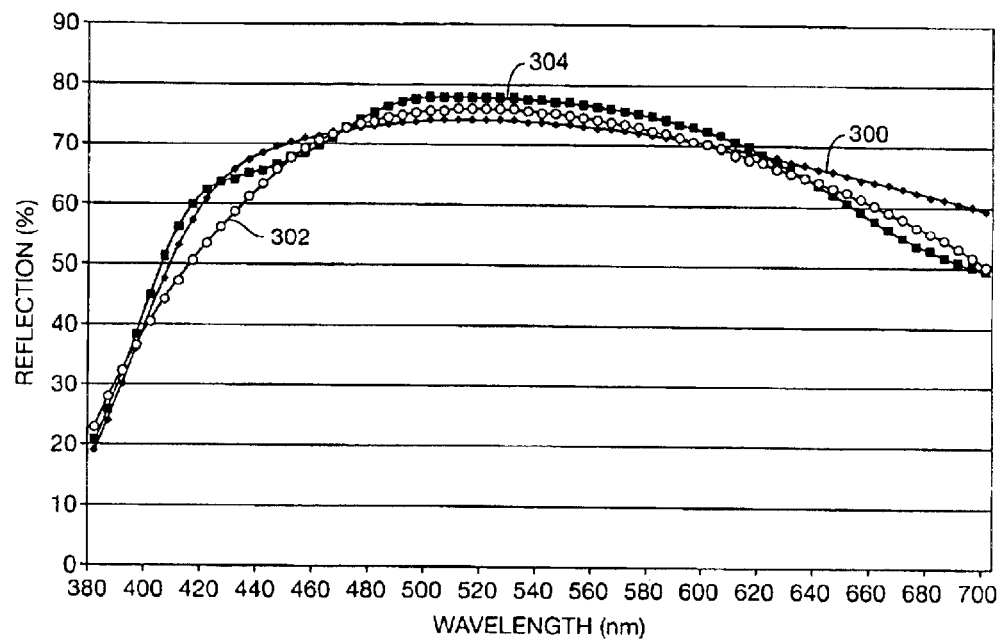
FIG. 3A is a family of simplified plots of reflectance versus wavelength measured for three different neutral optical designs.

FIG. 3A is a simplified family of plots of reflectance versus wavelength measured for three different neutral optical designs. The different number of layers ("layer counts") affects the total reflectance of the pigments. Each of these designs are centered in the middle of the visible region to avoid exhibiting a particular background tint. All three examples had diffraction grating patterns of 1,400 lines/mm, and each sample used ZnS for the high-index material, and $MgF_2$ for the low-index material. The first plot 300 shows the reflectance performance for three-layer design (HLH), each layer being one QWOT at 550 nm. Although a single pigment flake with a 3-layer dielectric stack might attain 20–40% reflectance, it is believed that higher reflectance here is due to a number of layers of pigment flakes over a light background, with multiple layers of flakes contributing to the overall reflectivity. The second plot 302 shows the reflectance performance for a seven-layer design: (HLH) at 500 nm; (L) at 550 nm; and (HLH) at 600 nm. The third plot 304 shows the reflectance performance for an eleven-layer design: (HLHLH) at 500 nm, (L) at 550 nm, and (HLHLH) at 600 nm.

Figure 3B:
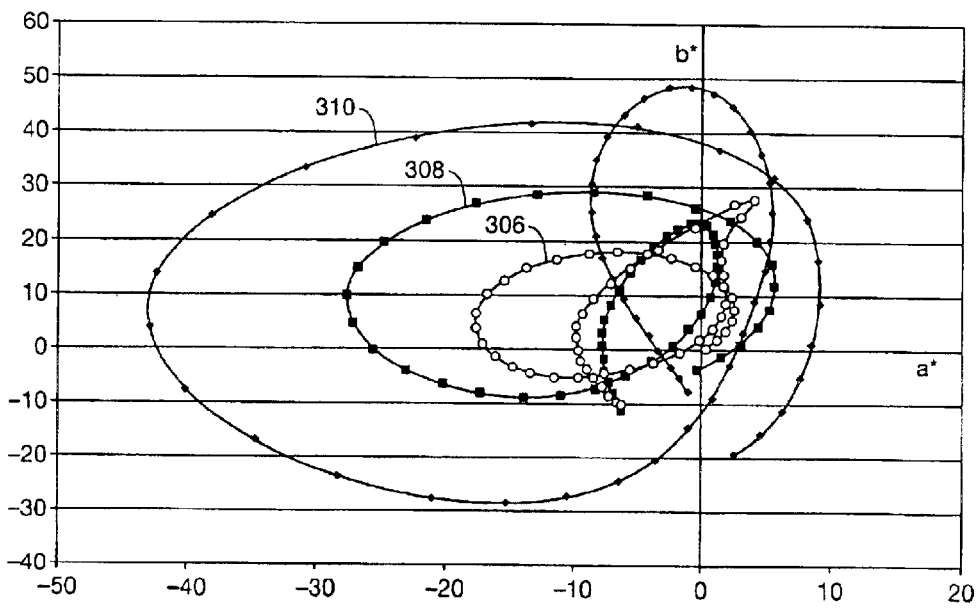
FIG. 3B is a family of goniospectrophotometric plots of the samples illustrated in FIG. 3A.

FIG. 3B is a family of simplified goniospectrophotometric plots of the samples illustrated in FIG. 3A. Note that the scale is different than on the family of plots shown in FIG. 2B, and that the color travel is generally less. The first plot 306 is for the three-layer design, the second plot 308 is for the seven-layer design, and the third plot 310 is for the eleven-layer design. These samples have relatively little color travel, which may be desirable in some applications.

IV. Comparison of Diffractive and Non-Diffractive Pigment Flakes

Dielectric diffractive pigments were formed by depositing thin film layers onto a release layer overlying polymer web substrates. Two polymer web substrates were patterned with diffractive gratings. One sample of dielectric diffractive pigment flakes was made on a substrate patterned with a diffraction grating having a frequency of 1,400 lines/mm, and another sample of flakes was made on a substrate patterned with a diffraction grating having a frequency of 2,000 lines/mm. A non-diffractive all-dielectric pigment was made by depositing the same thin film layers onto a release layer overlying a smooth (unpatterned) polymer web substrate. When mixed with an ink carrier and applied to a black background, the pigment flakes without the diffraction grating exhibited only a blue-to-purple ("color-shifting") color without a diffractive optical effect, while the pigment flakes having a diffraction grating of 1,400 lines/mm and pigment flakes having a diffraction grating of 2,000 lines/mm both exhibited diffractive optical effects in addition to a shifting blue-to-purple background color. These three color-shifting samples are referred to below as the "blue dichroic" samples.

The coating design used in making all three blue dichroic pigment flake samples was as follows:

1QWOT $MgF_2$ at 440 nm/ 1QWOT ZnS at 440 nm/ 1QWOT $MgF_2$ at 440 nm/

1QWOT ZnS at 440 nm/ 1QWOT $MgF_2$ at 440 nm/ 1QWOT ZnS at 440 nm/

1QWOT $MgF_2$ at 440 nm/ 3QWOT ZnS at 440 nm.

Figure 4A:
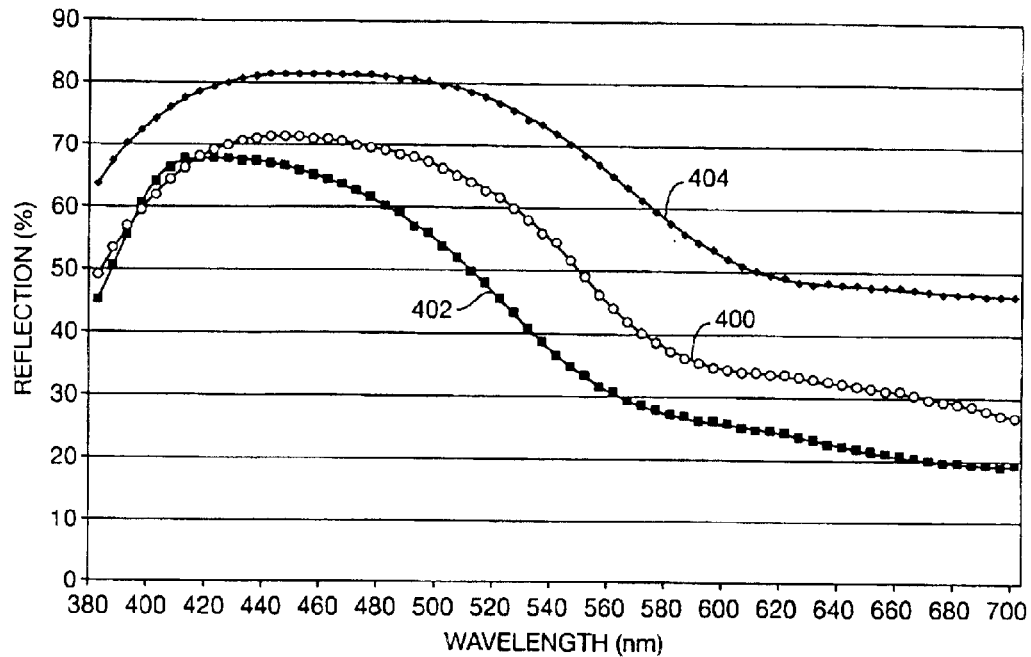
FIG. 4A is a family of simplified plots of reflectance versus wavelength comparing diffractive and non-diffractive samples.

FIG. 4A shows a family of reflectivity curves for the three blue dichroic pigment samples measured using a diffuse 8-degree integrating sphere. Each blue dichroic pigment sample was mixed with a clear carrier and drawn down onto a black card. The first curve 400 shows the reflectance for the sample made with blue dichroic diffractive pigment flakes having 1,400 lines/mm. The second curve 402 shows the reflectance for the sample made with blue dichroic diffractive pigment flakes having 2,000 lines/mm, and the third curve 404 shows the reflectance for the non-diffractive blue dichroic sample. The reflectivity color data show that the pigment draw-down samples presented a bluish dominating color.

Figure 4B:
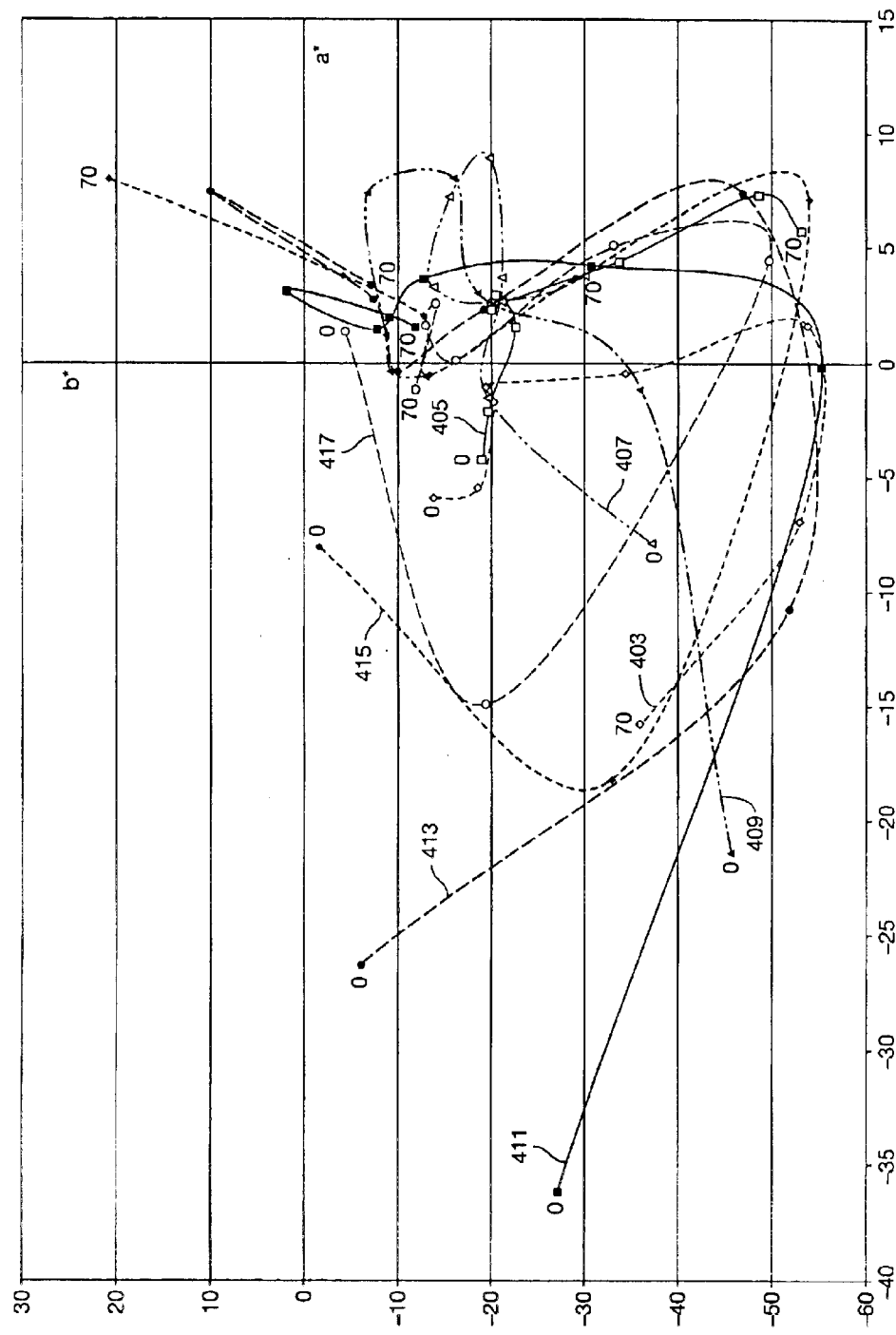
FIGS. 4B–4D show families of simplified goniospectrophotometric color trajectory and chromaticity plots of three different samples of all-dielectric pigments at various viewing angles.
Figure 4C:
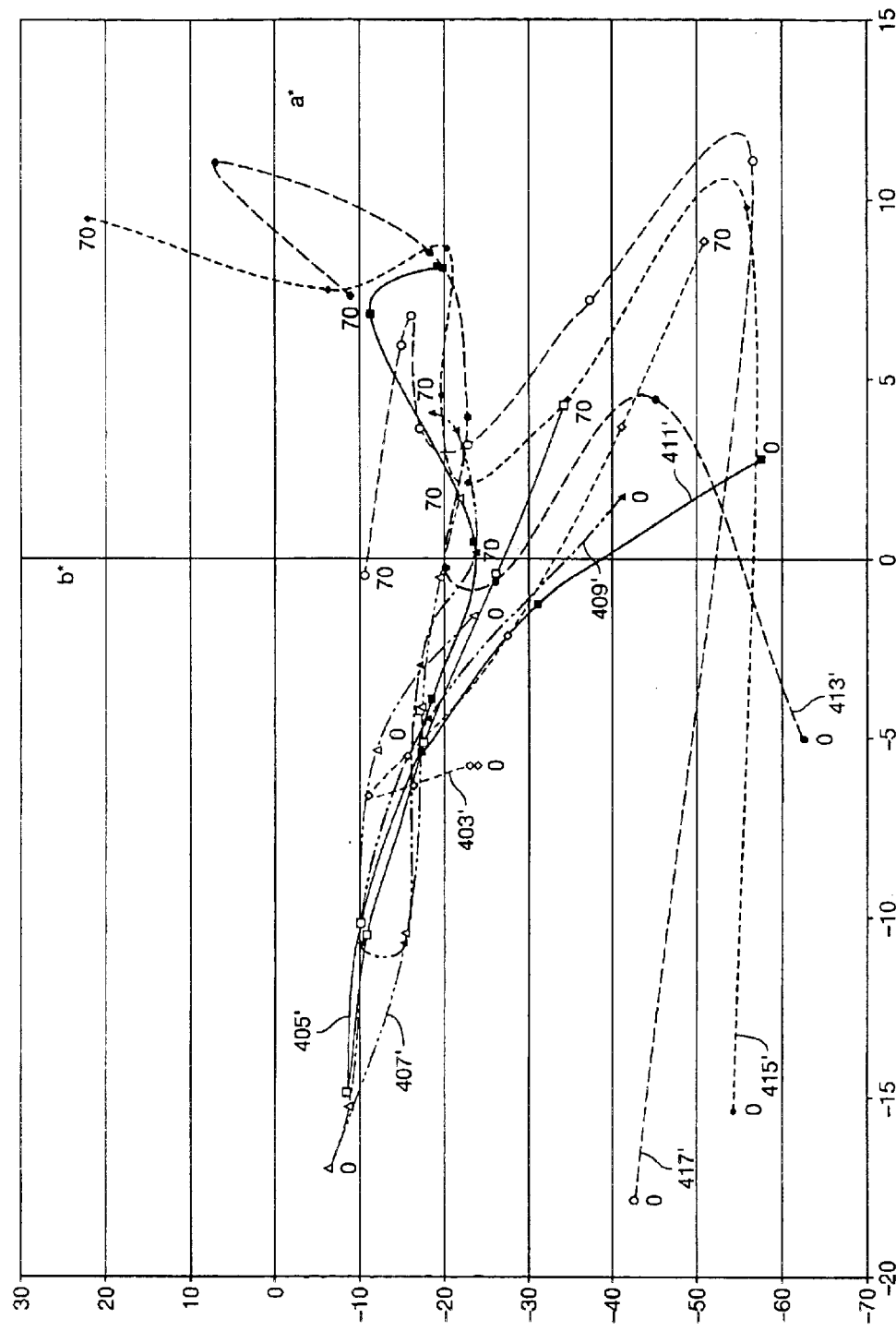
Figure 4D:
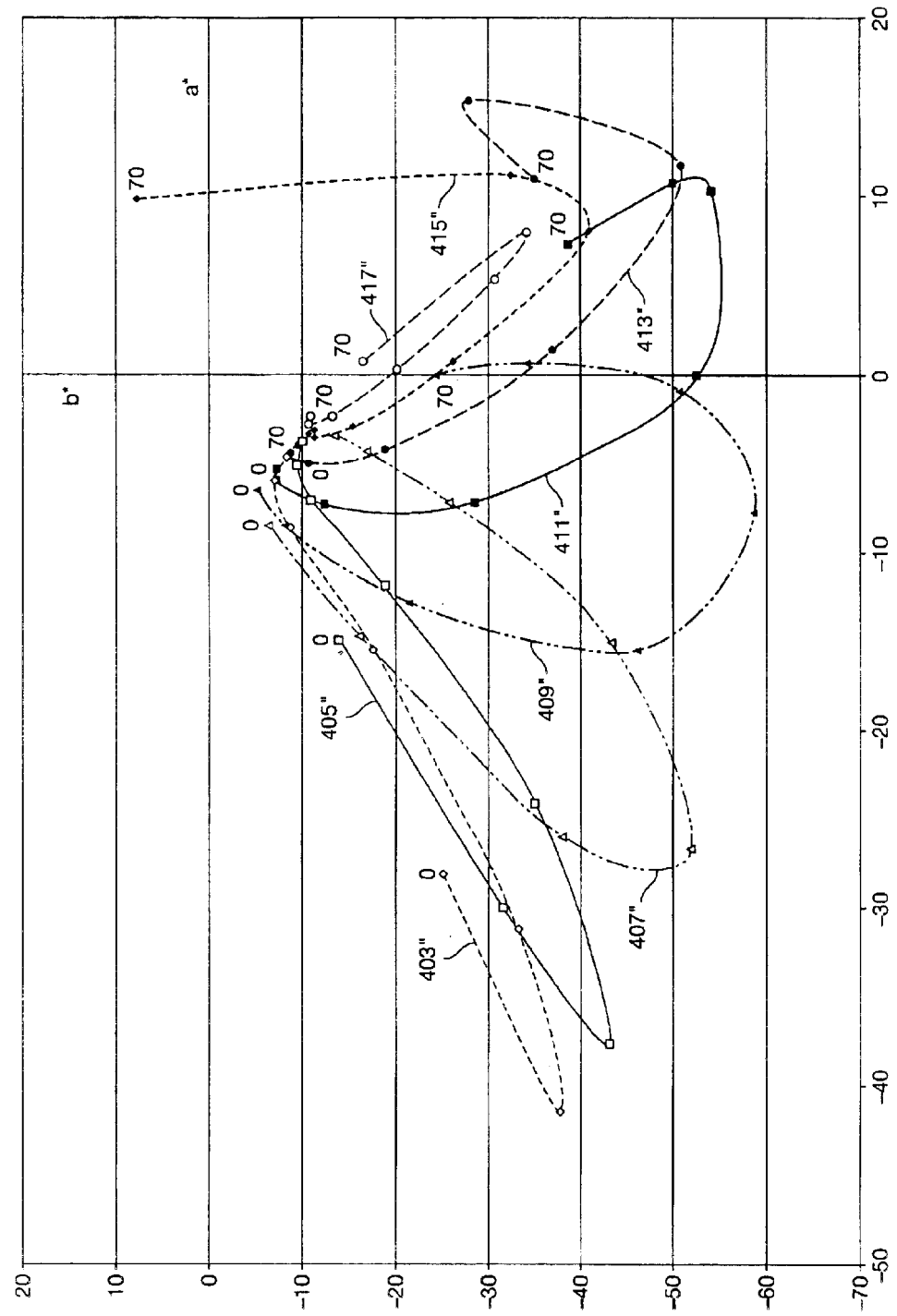

FIGS. 4B–4D are families of simplified goniospectrophotometric color trajectory and chromaticity plots of the 1,400 lines/mm, 2,000 lines/mm, and "flat" (non-diffractive) samples discussed above. The color travel plots (commonly known as a*b* diagrams) and reflectivity data were obtained using a MURAKAMI goniospectrophotometer. The a*b* diagrams show the change in color (a*, b* coordinates) for a fixed sample object coated with a pigment flake composition.

FIG. 4B shows color trajectories at different viewing angles for the blue dichroic pigment flake sample made with a diffraction grating of 1,400 lines/mm as the illumination angle is changed. These color trajectories aid in understanding the color variation that an observer experiences when viewing a curved object coated (e.g. painted) with the pigment. Each color trajectory represents a constant viewing angle, with a continuous line of the trajectory connecting measured data points (color values) for a series of illumination angles.

In order to appreciate the perception by an observer of a curved object coated with a pigment, a single trajectory is insufficient as both the viewer and illumination angle change. The color space in the a*b* diagrams that is traversed with the incremental changes in viewer and illumination conditions help one to understand the optical effect obtained by coating a curved surface with paint or ink according to embodiments of the present invention. One of the benefits of the inventive pigments and its use in a paint to highlight the curvature of an object over a range of lighting conditions. The color space may be plotted or derived at any point on a first trajectory, where movement on the trajectory represents a change in inclination of the illumination source with respect to the surface normal. Adjacent trajectories could be plotted to correspond to changes in viewer orientation such as occurs when a fixed observer views the curvature of an object.

The first curve (color trajectory) 403 in the a*b* diagram of FIG. 4B represents a fixed viewing angle of twelve degrees, the second curve 405 represents a fixed viewing angle of twenty degrees, the third curve 407 represents a fixed viewing angle of thirty degrees, the fourth curve 409 represents a fixed viewing angle of forty degrees, the fifth curve 411 represents a fixed viewing angle of fifty degrees, the sixth curve 413 represents a fixed viewing angle of sixty degrees, the seventh curve 415 represents a fixed viewing angle of seventy degrees, and the eighth curve 417 represents a fixed viewing angle of eighty degrees.

FIG. 4C shows color trajectories for the blue dichroic pigment flake sample made with a diffraction grating of 2,000 lines/mm. The first curve (color trajectory) 403' in the a*b* diagram of FIG. 4C represents a fixed viewing angle of twelve degrees, the second curve 405' represents a fixed viewing angle of twenty degrees, the third curve 407' represents a fixed viewing angle of thirty degrees, the fourth curve 409' represents a fixed viewing angle of forty degrees, the fifth curve 411' represents a fixed viewing angle of fifty degrees, the sixth curve 413' represents a fixed viewing angle of sixty degrees, the seventh curve 415' represents a fixed viewing angle of seventy degrees, and the eighth curve 417' represents a fixed viewing angle of eighty degrees.

FIG. 4D shows the color trajectories for the flat blue dichroic pigment flake sample that was made without a diffraction grating pattern. The first curve (color trajectory) 403" in the a*b* diagram of FIG. 4D represents a fixed viewing angle of twelve degrees, the second curve 405" represents a fixed viewing angle of twenty degrees, the third curve 407" represents a fixed viewing angle of thirty degrees, the fourth curve 409" represents a fixed viewing angle of forty degrees, the fifth curve 411" represents a fixed viewing angle of fifty degrees, the sixth curve 413" represents a fixed viewing angle of sixty degrees, the seventh curve 415" represents a fixed viewing angle of seventy degrees, and the eighth curve 417" represents a fixed viewing angle of eighty degrees.

The color coordinates in FIGS. 4B–4D were calculated from the full spectral response of the pigments as the instrument's illumination source orientation was stepped from 0 to 70 degrees from normal to the sample in 10-degree increments for each viewing angle. Thus, each data point on each curve represents a 10-degree step in the illumination source orientation. Thus, the value of the angle of the illumination source at each data point can be determined by counting from either the beginning or end of each of the trajectory terminal ends, which are labeled as either 0 or 70 in the diagram. Thus, for a 50-degree viewing angle with respect to the surface of the sample, sweeping an illumination source from the normal orientation to a 70-degree angle of incidence results in an observed color corresponding to the trajectory.

Figure 4E:
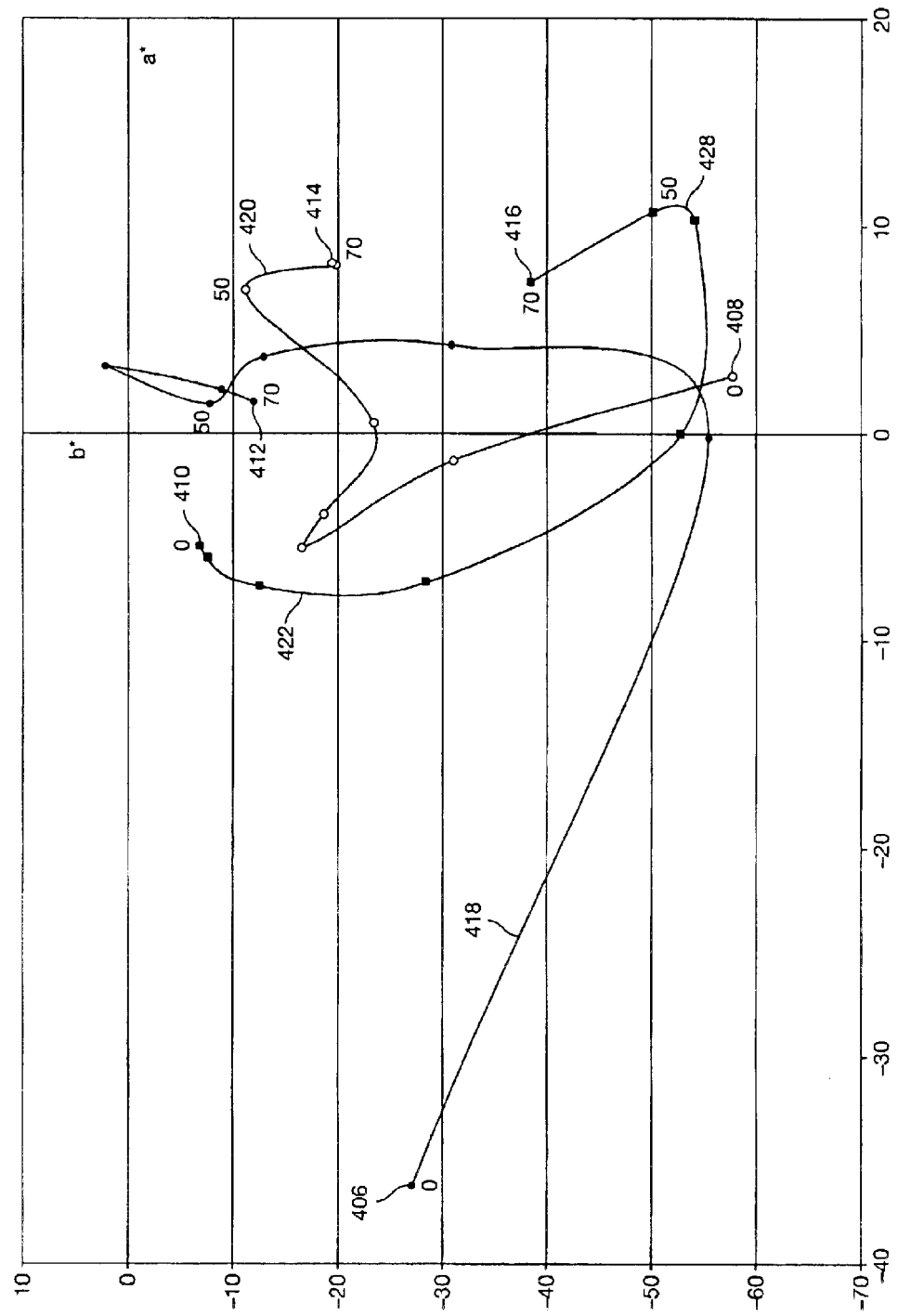
FIG. 4E compares the goniospectrophotometric plots of the samples illustrated in FIGS. 4B–4D at a common viewing angle.

FIG. 4E is a family of the color travel plots at a fifty-degree viewing angle for the three blue dichroic samples discussed above in relation to FIGS. 4A–4C. The first plot 418 represents the blue dichroic pigment sample with 1,400 lines/mm as the illumination angle changes from 0–70 degrees from normal to the sample, the second plot 420 represents the blue dichroic pigment sample with 2,000 lines/mm, and the third plot 422 represents the flat (unpatterned) non-diffractive blue pigment sample.

For the non-diffractive blue pigment, the color trajectory 422 shown in the a*b* diagram of FIG. 4E forms an oval-like shape having an apex 428 near the specular condition, and progresses in a counter-clockwise fashion with the opposing apex 410 at the origin, which is a typical trajectory path for such non-diffractive dichroic pigment flakes. This type of color trajectory is predictive of the color trajectories of the non-diffractive dichroic pigment at other illumination and viewing angles.

For the diffractive blue dichroic pigments, the trajectories 418, 420 shown in the a*b* diagram of FIG. 4E do not form regular color trajectories commonly associated with dichroic pigments. The irregular paths of these trajectories cover a wider area of color space with minimum overlap, which will provide a higher color contrast as well as distinctive colors along a curved surface. Thus, the various regions along a curved surface coated with the diffractive color-shifting blue dichroic pigments will exhibit different sets of colors compared to the surface coated with a similar color-shifting dichroic pigment without a diffractive structure.

Where optical diffractive and interference effects combine, the coloration ranges will generally not be symmetric about a point, but rather will be unique for each position of viewer and illumination. By combining color-shifting effects with diffractive color, the curvature and depth of an object are highlighted in unique color schemes that vary in both diffuse and highly collimated lighting conditions. FIG. 4E shows the color trajectories of the samples when viewed at 50 degrees with the incident light changing between zero and 70 degrees on 10 degrees intervals. The highest chroma for non-diffractive sample is close to the specular reflection (50 degrees incidence) 428. However, in the case of the diffractive pigments with a frequency of 1,400 lines/mm the highest chroma is obtained at an illumination orientation of about 10 degrees from normal. In the case of sample with 2,000 lines/mm the zero degrees (normal) illumination 408 is the condition that creates the highest chroma. Of course, other groove frequency, shape, depth, etc will change the color trajectories in new different ways not seen before.

V. Applications

Figure 5:
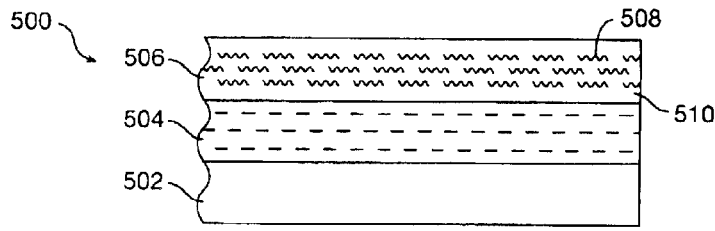
FIG. 5 is a simplified cross section of a painted article according to an embodiment of the present invention.

FIG. 5 is a simplified cross section of a portion of an article 500 according to an embodiment of the present invention. An object or substrate 502 has been painted with a layer of conventional paint 504, or otherwise coated or colored. For example, in some embodiments the substrate could be white, and the paint layer omitted. A layer of paint 506 according to an embodiment of the present invention has been applied to the article. This paint includes all-dielectric diffractive pigment flakes 508 dispersed in a carrier 510, such as a paint vehicle or ink vehicle. In one embodiment, the carrier is clear, in another it is tinted, but it is generally transparent to take advantage of the diffractive characteristics of the pigment flakes. A colored dichroic diffractive pigment composition may be used to obtain a diffractive effect similar to using a "white" (neutral) diffractive pigment composition on a white object. For example, a red dichroic diffractive pigment composition may be applied to a red object to obtain a red diffractive effect.

In a particular embodiment, the object is painted with white paint and then overpainted with a paint according to an embodiment of the present invention. If the diffractive pigment flakes are neutral in color, this imparts a white diffractive effect to the object, which can dramatically highlight curved surfaces of the object. In other embodiments, the diffractive pigment do not impart an appreciable background color when viewed at a first viewing angle, but impart a background color when viewed at a second viewing angle, in addition to the diffractive color(s).

VI. Exemplary Methods

Figure 6:
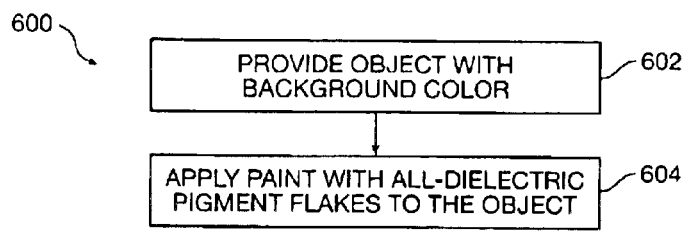
FIG. 6 is a simplified flow chart of a process according to an embodiment of the present invention.

FIG. 6 is a simplified flow chart of a method 600 of producing an article with a diffractive effect according to an embodiment of the present invention. An object with a background color is provided (step 602). The background color could be painted on the object with conventional paint, or could be the color of the material the object is made of. In a particular embodiment, the background color is white. Paint containing all-dielectric diffractive pigment flakes is applied to the object (step 604). The paint could have a clear or dyed carrier, and could contain other pigment. The diffractive pigment flakes could include be dichroic or otherwise provide thin-film interference, in addition to being diffractive.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An all-dielectric diffractive pigment flake comprising:
   an inorganic dielectric thin film layer including a surface having
   a diffraction grating pattern.

2. The all-dielectric diffractive pigment flake of claim 1 further comprising a second dielectric thin film layer forming a diffractive interface at the surface of the first inorganic dielectric thin film layer.

3. The all-dielectric diffractive pigment of claim 2 wherein the second dielectric thin film layer includes the diffraction grating pattern on a second surface, the second surface being distal from the inorganic dielectric thin film layer.

4. An all-dielectric diffractive pigment flake comprising:
a plurality of dielectric thin film layers, at least one of the plurality of dielectric thin film layers including a diffraction grating pattern, the all-dielectric diffractive pigment flake having an average reflectivity in the visible spectrum between 20% and 90% measured in air.

5. The all-dielectric pigment flake of claim 4 wherein at least some of the plurality of dielectric thin film layers form a dichroic filter.

6. The all-dielectric pigment flake of claim 5 wherein the dichroic filter reflects a first color at a first viewing angle and a second color at a second viewing angle.

7. The all-dielectric pigment flake of claim 4 wherein the diffraction grating pattern is replicated through at least some adjacent layers of the plurality of dielectric thin film layers.

8. The all-dielectric pigment flake of claim 4 wherein the plurality of dielectric thin film layers includes alternating layers of high-index dielectric material and low-index dielectric material.

9. An all-dielectric pigment flake comprising:
a plurality of dielectric layers having a diffraction grating pattern replicated through the plurality of dielectric layers to form diffractive interfaces between adjacent dielectric layers.

10. The all-dielectric pigment flake of claim 9 wherein the diffractive interfaces provide a combined reflectivity between 20% and 90% measured in air.

11. A diffractive pigment composition comprising:
a pigment medium and
a plurality of all-dielectric diffractive pigment flakes dispersed in the pigment medium, the all-dielectric diffractive pigment flakes having:
a first dielectric layer patterned with a diffractive grating pattern, and
a second dielectric layer disposed on the diffractive grating pattern of the first dielectric layer to form a first diffractive interface and replicating the diffractive grating pattern to form a second diffractive interface at a surface of the second dielectric layer.

12. The diffractive pigment composition of claim 11 wherein the second diffractive interface is formed between the second dielectric layer and the pigment medium.

13. The diffractive pigment composition of claim 11 wherein the all-dielectric diffractive pigment flakes comprise an odd number of dielectric layers, including a first outer layer and a second outer layer replicating the diffractive grating pattern and forming diffractive interfaces with the pigment medium.

14. The diffractive pigment composition of claim 13 wherein the first outer layer and the second outer layer are high-index layers and the pigment medium is a low-index medium.

15. The diffractive pigment composition of claim 13 wherein the first outer layer and the second outer layer are low-index layers and the pigment medium is a high-index medium.

16. The diffractive pigment composition of claim 11 wherein the all-dielectric diffractive pigment flakes include an outer dielectric layer that does not form a diffractive interface with the pigment medium.

17. The diffractive pigment composition of claim 16 wherein the outer dielectric layer is a low-index layer and the pigment medium is a low-index medium.

18. The diffractive pigment composition of claim 11 wherein the pigment medium is clear.

19. The diffractive pigment composition of claim 11 wherein the paint medium is a tinted or dyed paint vehicle.

20. The diffractive pigment composition of claim 11 wherein the all-dielectric diffractive pigment flakes include a thin-film optical interference structure.

21. The diffractive pigment composition of claim 20 wherein the thin-film optical interference structure provides color-shifting as a function of viewing angle.

22. A method of imparting a diffractive effect to a surface of an article, the method comprising:
providing an object having a background color, and
applying all-dielectric diffractive pigment flakes to the object.

23. The method of claim 22 wherein the background color is white and the diffractive effect imparted to the article is a white diffractive effect.

24. The method of claim 22 wherein the diffractive effect essentially preserves the background color of the object.

25. The method of claim 22 wherein the all-dielectric diffractive pigment flakes include a thin-film interference structure and applying the all-dielectric diffractive pigment flakes to the object further imparts a color-shifting effect to the article.

* * * * *